Dec. 9, 1930.     L. E. MIQUET     1,783,971
LOCK
Filed Oct. 25, 1927     2 Sheets-Sheet 2
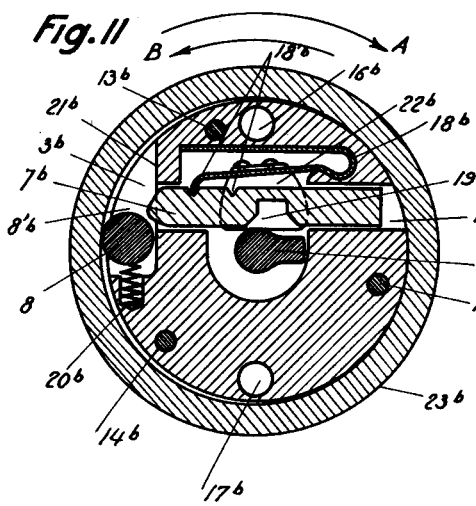
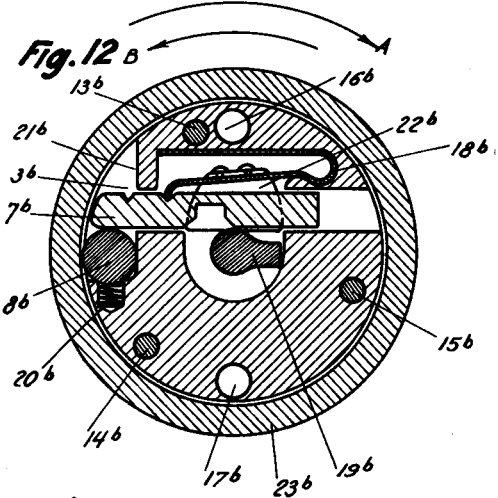
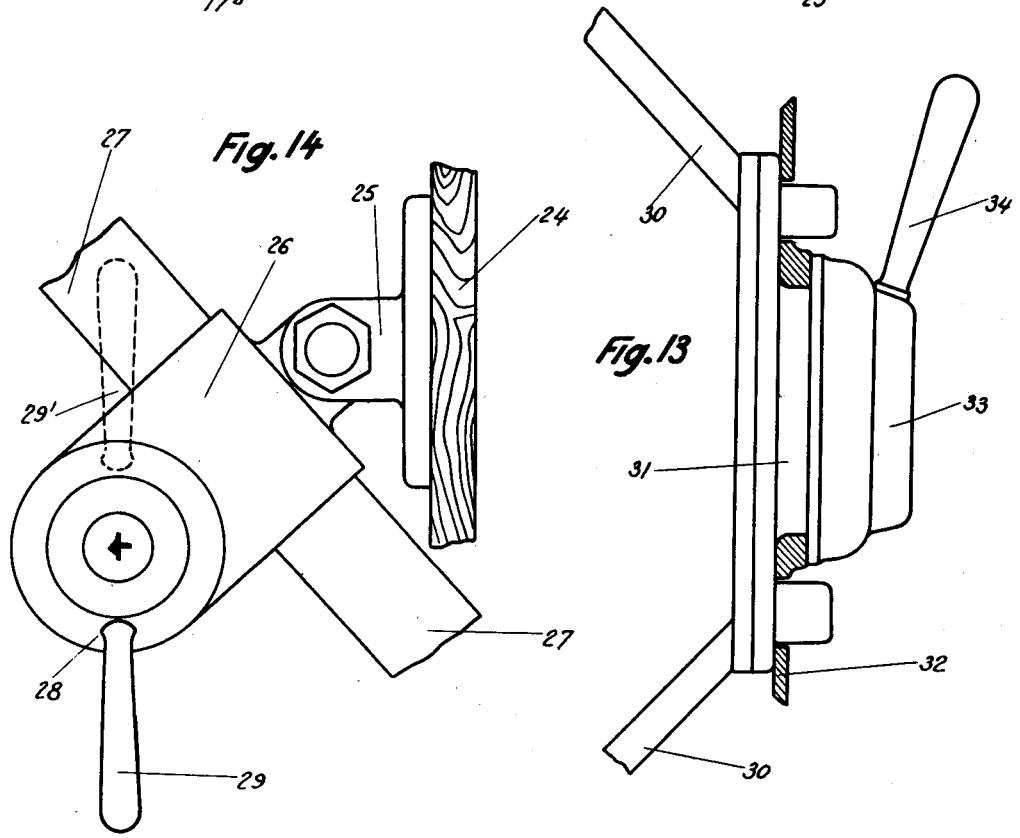
Inventor:
Louis Miquet
Fred F. Harlow
Attorney Patented Dec. 9, 1930

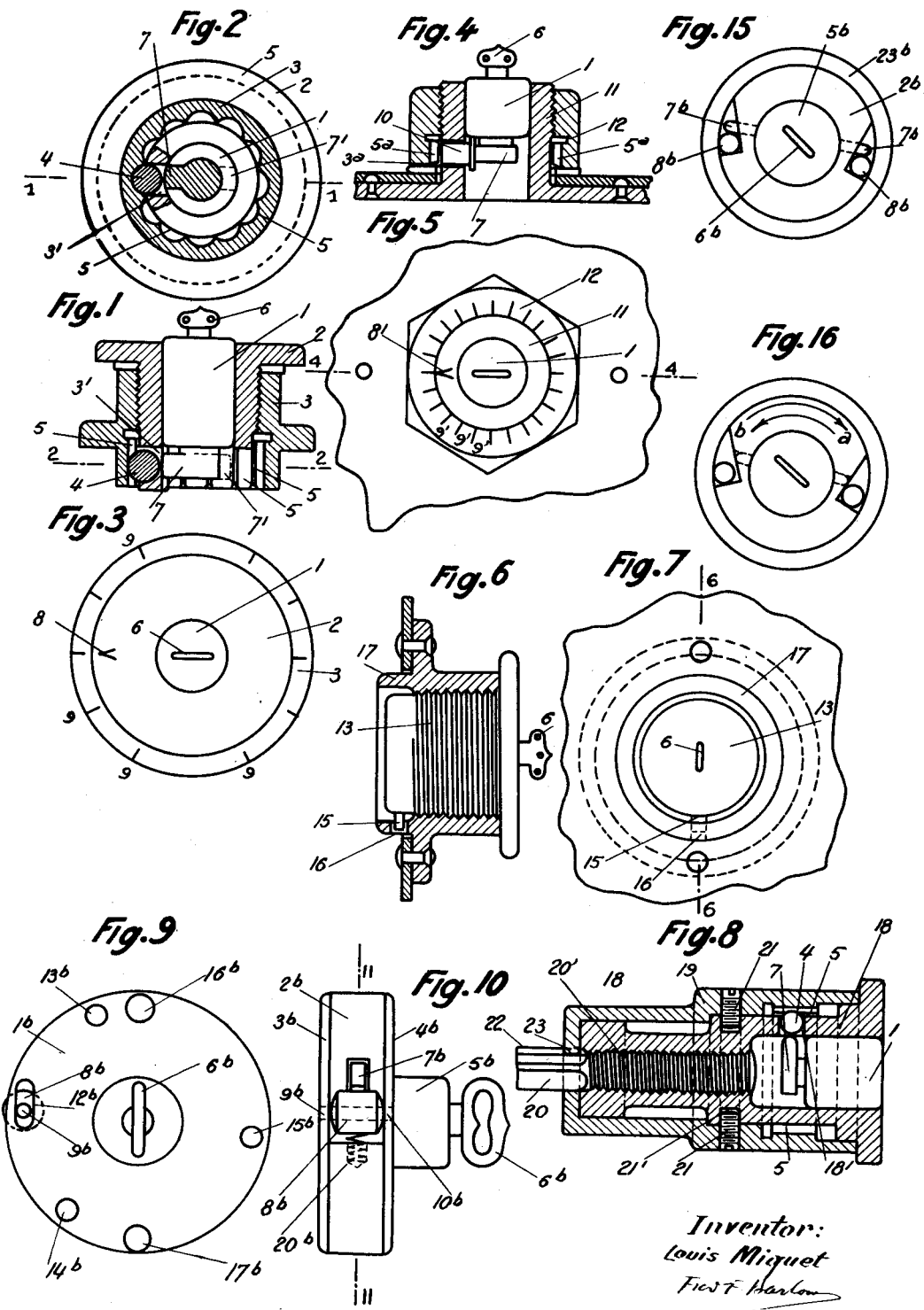

1,783,971

UNITED STATES PATENT OFFICE

LOUIS EUGENE MIQUET, OF NEUILLY, FRANCE

LOCK

Application filed October 25, 1927, Serial No. 228,571, and in France October 27, 1926.

My invention relates to improvements in locks and more particularly to the locking of rotatable elements.

One of the objects of the invention is to provide a lock of the character indicated which shall be readily applicable to an element which is screwed into another for preventing relative movement between said elements and consequently the removal of one of said elements from another in certain cases.

A more specific object of the invention is to provide a lock which shall be particularly designed for use in connection with automobile accessories and parts which are subjected to theft such as the filling plugs of the radiator and fuel tank, spare wheels and even the steering wheel shaft to prevent movement thereof.

The invention is capable of wide application in the industrial field and other objects of the invention will be obvious to those skilled in the art to which it relates with reference to the accompanying drawing forming part of this specification and in which—

Fig. 1 is a section of my improved lock applied to a screw plug along the line 1—1 of Fig. 2;

Fig. 2 is a section along the line 2—2 of Fig. 1;

Fig. 3 is a plan view of Fig. 1;

Fig. 4 is a view of my improved lock as applied to a nut screwed upon a threaded extension, being a section along the line 4—4 of Fig. 5;

Fig. 5 is a plan view of Fig. 4;

Fig. 6 is a modification of Fig. 1, being a section along the line 6—6 of Fig. 7 with the plug in elevation;

Fig. 7 is a side elevation of Fig. 6;

Fig. 8 is a sectional view of my improved lock as applied to a control rod for preventing linear displacement thereof;

Fig. 9 is an elevational view of a modified form of lock;

Fig. 10 is an elevational view looking from the left in Fig. 9;

Fig. 11 is a section along the line 11—11 of Fig. 10;

Fig. 12 is a view similar to Fig. 11 showing the parts in a different position;

Fig. 13 is a fragmentary view in elevation of my improved lock as applied to the steering wheel shaft of an automobile;

Fig. 14 is a fragmentary view in elevation of my improved lock applied to the securing nut of a spare wheel, parts being shown in section;

Fig. 15 is an elevational view of a modification of the embodiment illustrated in Figs. 9 to 12; and Fig. 16 is a view similar to Fig. 15 showing the parts in a different position.

Referring to the drawing and more particularly Figs. 1 to 3, a key-controlled lock 1 is fastened in a screw-plug 2 concentrically. The said lock has not been illustrated in detail as the interior elements thereof form no particular part of the present invention and any suitable lock will suffice whose rotary movement is controlled by a key as is well known in the art. The said plug 2 is shown as screwed into a tapped collar 3. Near the lower extremity of plug 2 is formed a slot 3' in which is lodged a ball 4 which forms the bolt of the lock. The lower portion of the sleeve 3 is provided with arcuate notches 5 disposed at equal intervals on the inner periphery thereof. The said notches are of such a radius as to accommodate the ball 4 when disposed therein. The lock proper 1, above mentioned, is controlled in the usual manner by a detachable key 6 and is provided with a cam 7 situated in the same plane as the ball 4.

On the plug 2 opposite the ball 4 is provided a radially disposed arrow 8 and on the collar 3 opposite the notches 5 are provided the radially extending indicia 9 for indicating the position of said ball with respect to said notches.

In Figs. 1 to 3 the plug 2 is shown screwed in and the detachable key 6 in place. In this position the cam 7 pushes the ball 4 outwardly in a radial direction into one of the notches 5 which blocks the plug 2 and prevents the unscrewing thereof. The plug 2 is unlocked by simply turning the key 6 to bring the cam 7 into the position 7' indicated in dotted lines in Figs. 1 and 2. This maneuver liberates the ball 4 and permits the plug 2 to be rotated for unscrewing. As plug 2 is unscrewed the ball 4 is cammed by the wall of one of the notches 5 into the slot 3' whereby complete removal of the plug 2 is permitted. Once the plug 2 has been replaced it is merely necessary to turn the key 6 and remove it for preventing subsequent removal of the said plug.

Figs. 4 and 5 show how the lock is adapted to a removable nut. The lock 1 operated by the key 6 as before is provided with a rotatable cam 7 all as previously shown. The said lock 1 is lodged in a threaded extension 11 and the cam 7 cooperates with a locking bar 10 instead of a ball which is disposed in a slot 3a furnished in the said extension in a radial direction. Screwed on the extension 11 is a nut 12 provided with notches 5a similar to those previously described. The outer extremity of the bar 10 is rounded to correspond with the notches 5a.

Locking of the nut 12 in place on the extension 11 is accomplished in the same manner as was described in connection with the plug 2, the bar 10 entering the slot 3a in the same fashion that the ball 4 entered the notch 3' when cam 7 is removed and the nut 12 rotated. Once nut 12 is screwed down it is simply necessary to turn the cam 7 in place against the bar 10 for preventing subsequent removal when the key 6 has been removed. In order to locate the position of bar 10 with respect to the corresponding notches 5a, indicia 9' are disposed radially on the nut 12 which cooperate with an arrow 8' disposed radially opposite the slot 3a on the extension 11.

It will be noted in connection with Figs. 1 to 3 that the plug 2 always occupies the same position once it is screwed down, its function being merely to close an opening. It is therefore possible to simplify the structure as shown in Figs. 6 and 7. In this embodiment the lock and the plug are made in a single piece, that is, the exterior of the lock itself is made in the form of a plug as shown at 13 and projecting from the said plug is the usual locking bolt 15 of the said lock. The plug or lock 13 is screwed into a collar 17 which is provided with a notch 16 adapted to receive the bolt 15 when the plug 13 is screwed down and the key 6 is turned. Obviously removal of the said key thereafter prevents the subsequent removal of plug 13.

It will be obvious to those skilled in the art that the embodiments of my invention so far disclosed are susceptible to use in many situations.

By way of a concrete example the lock might be readily mounted in a radiator cap of an automobile which caps are frequently of costly ornamental construction and consequently subjected to being stolen. In a similar manner the lock is readily applicable to the refilling plug of the fuel tank of an automobile thereby preventing theft of the gasoline during the owner's absence.

Fig. 8 illustrates how my improved lock is adapted to be used with a longitudinally displaceable control rod such as for example that upon which the spark and throttle levers in an automobile are mounted. In this embodiment the lock 1, the ball 4, the cam 7 and the notches 5 are constructed and arranged as described in connection with Figs. 1 to 3. The lock 1, however, is here mounted in a sleeve 18 rotatably mounted in a casing 19 by means of a plurality of fingers 21 carried by said casing and projecting into a circular groove 21' on said sleeve. The ball 4 is lodged in a slot 18' extending in a radial direction through said sleeve.

A threaded control rod 20 is provided with a threaded extremity 21' which is screwed into the sleeve 18. The said rod is provided with a longitudinally extending slot 22 into which projects a pin 23 carried by the casing 19 in order to prevent rotation of the rod 20 with the sleeve 18 and hence cause longitudinal displacement of said rod when said sleeve is rotated.

The operation is as previously described. When the parts are in the position shown in Fig. 8 cam 7 pushes the ball 4 outwardly through the slot 18' into notches 5 which prevents sleeve 18 from being rotated and hence the longitudinal displacement of rod 20. When it is desired to liberate the sleeve 18 it is simply necessary to insert the key in the lock 1 and rotate the cam 7 as previously described.

In all of the embodiments thus far described it has been necessary to have a definite relation between the fixed member and the rotated member before locking could take place. In certain cases it is desirable to be able to lock the movable member with respect to the fixed member irrespective of their relative positions. The lock arrangement shown in Figs. 9 to 12 embodies such a structure.

As therein shown 1b represents the lock casing comprising a centrally disposed cylinder 2b and two cheeks 3b and 4b. Concentric with the casing 1b is a small cylinder 5b containing the elements which are operated by a key 6b. As before, the locking elements controlled by the key 6b form no particular part of this invention and may be the usual well-known cylinder lock. The cylinder 2b is provided with a slot 11b and within said slot is slidably mounted a locking bar 7. The said cylinder is also provided with a notch 8'b in which is disposed a roller 8b. The said notch is of such a shape that it forms with an exterior ring 23b a recess in one end of which the ball 8b is free to turn and in the other end of which the said ball becomes wedged between the said cylinder and said ring. The said roller 8b is provided with two trunnions 9b and 10b guided by elongated openings 12b provided respectively in cheeks 3b and 4b.

The whole is assembled by means of screws 13b 14b and 15b and holes 16b and 17b are provided for fixing the device to the element which it is desired to lock from rotation.

The bolt 7b is provided with notches 18'b with which cooperate a leaf spring 18b. The said bolt is also provided with a notch 19'b with which cooperates an arm 19b carried by the shaft of the lock cylinder 5b. A spring 20b mounted in one end of the slot 8'b causes the roller 8b to normally contact with the wedging surface 21b. The spring 18b carries a stop member 22b.

When the cylinder 2b and parts carried thereby are attached to one of the elements which it is desired to lock, the ring 23b is attached to the remaining element associated with said first mentioned element.

The operation of the embodiment just described is as follows:

Referring to Fig. 11, when the lock casing 1b is turned in the direction of the arrow A, roller 8b is carried against the radial face of notch 8'b and nothing prevents rotation of the said casing in the said direction as the roller is free to turn. If it is attempted to turn the said casing in the direction of the arrow B roller 8b will tend to move along the surface 21b and immediately becomes wedged between the said surface and the interior circular surface of ring 23. Movement of the casing in the direction of the arrow B is therefore instantaneously blocked at all times.

In Fig. 12 the bar 7b has been moved to its outer position by the key 6b confining the roller 8b to the opposite end of the notch where it is free to turn and thereby permits rotation of the casing 1b in either direction.

Fig. 13 shows a practical illustration of how the last described embodiment may be employed for locking the steering gear of an automobile. At 24 is shown part of the dash-board of an automobile carrying a socket 25 in which is mounted an extensible collar 26. Extending through the collar 26 is the steering wheel shaft 27. The circular member surrounding the lock is represented at 28 and is furnished with a handle 29. Rotation of member 28 has for effect to tighten the collar 26 about the shaft 27 and prevent rotary movement thereof this blocking action taking place when the handle 29 is moved to the position 29' indicated by dotted lines. It is then merely necessary to insert a key and turn which liberates the roller 8 as previously described and prevents manipulation of the handle 29 in the reverse direction.

Fig. 14 shows the same embodiment applied to a spare wheel of an automobile for preventing theft thereof. On a plurality of supports 30 is mounted a spare wheel 32. A projection 31 extends through said wheel and carries a locking device 33 similar to that described in connection with Fig. 13. The said lock is provided with a handle 34, the rotation of which locks the said wheel to its support similarly to the lock described in connection with Fig. 13.

In certain cases it may be desirable to lock the rotatable element against rotation in either direction. In such a case the locking device described in connection with Figs. 9 to 12 is furnished with two opposing locking bars and two rollers as shown in Figs. 15 and 16. In Fig. 15 the bars 7b retain the rollers 8b at the far end of their slots and allow free rotation of the ring 23b in either direction as previously described. In Fig. 16 the bars 7b have been drawn back and have liberated the rollers 8b. Attempted rotation of the ring 23b in either direction carries the roller 8b to the narrow end of its slot wherein it becomes wedged as previously described and blocks the said rotation.

Obviously the herein described locking device is susceptible to many other applications without departing from the scope of the appended claims.

Having now described my invention what I claim as new and desire to secure by Letters Patent is—

1. A locking device of the type described comprising, in combination, a cylinder, a notch formed in the periphery of said cylinder, one end of said notch being shallower than the other, a roller mounted in said notch, a ring surrounding said cylinder covering said notch, means normally moving said roller to the shallow end of said notch and key-controlled means for confining said roller to the deeper end of said notch for the purpose disclosed.

2. A locking device of the type described comprising, in combination, a cylinder, a notch formed in the periphery of said cylinder, one end of said notch being shallower than the other, a roller mounted in said notch, trunnions on said roller, guides for said trunnions, a ring surrounding said cylinder covering said notch, means normally moving said roller to the shallow end of said notch and key-controlled means for confining said roller to the deeper end of said notch for the purpose disclosed.

3. A locking device of the type described comprising, in combination, a cylinder, a notch formed in the periphery of said cylinder, one end of said notch being shallower than the other, a roller mounted in said notch, a ring surrounding said cylinder covering said notch, a spring in said notch normally moving said roller to the shallow end of said notch and key-controlled means for confining said roller to the deeper end of said notch for the purpose disclosed.

4. A locking device of the type described comprising, in combination, a cylinder, a notch formed in the periphery of said cylinder, one end of said notch being shallower than the other, a roller mounted in said notch, a ring surrounding said cylinder covering said notch, a spring in said notch normally moving said roller to the shallow end of said notch, a slidably mounted bar in said cylinder adjacent said notch and key-controlled means for causing said bar to move into said notch and confine said roller to the deeper end thereof for the purpose disclosed.

5. A locking device of the type described comprising, in combination, a cylinder, a notch formed in the periphery of said cylinder, one end of said notch being shallower than the other, a roller mounted in said notch, a ring surrounding said cylinder covering said notch, a spring in said notch normally moving said roller to the shallow end of said notch, a slidably mounted bar in said cylinder adjacent said notch, a notch formed in said bar and a key-controlled rotatable arm engaging said notch for causing said bar to move into said notch of said cylinder and confine said roller to the deeper end thereof for the purpose disclosed.

6. A locking device of the type described comprising, in combination, a cylinder, a notch formed in the periphery of said cylinder, one end of said notch being shallower than the other, a roller mounted in said notch, a ring surrounding said cylinder covering said notch, a spring in said notch normally moving said roller to the shallow end of said notch, a slidably mounted bar in said cylinder adjacent said notch and a key-controlled cam for reciprocating said bar in and out of said notch for the purpose disclosed.

7. A locking device of the type described comprising, in combination, a cylinder, a plurality of notches formed in the periphery of said cylinder, one end of the said notches being shallower than the other, a roller mounted in each of said notches, a ring surrounding said cylinder covering said notches, a spring in each of said notches normally moving said rollers to the shallow end of said notches, a plurality of slidably mounted bars in said cylinder adjacent said notches and key-controlled means for causing said bars to move into said notches and confine the rollers therein to the deeper end thereof for the purpose disclosed.

8. A locking device for preventing rotation of a rotatable element with respect to a fixed element comprising, in combination, a cylinder, a plurality of bars slidably mounted in said cylinder, a rotatable ring surrounding said cylinder, a roller for each of said bars mounted between said ring and said cylinder, means for normally preventing rotation of each of said rollers during relative movement between said cylinder and said ring and key-controlled means for operating said bars to prevent said first mentioned means from becoming effective.

9. A locking device of the type described comprising, in combination, a cylinder, a plurality of notches formed in the periphery of said cylinder, one end of each of said notches being shallower than the other, a roller mounted in each of said notches, a ring surrounding said cylinder covering said notches, means normally moving said rollers to the shallow end of their notches and key-controlled means for confining said rollers to the deeper end of their notches for the purpose disclosed.

10. A locking device of the type described comprising, in combination, a cylinder, a plurality of notches formed in the periphery of said cylinder, one end of each of said notches being shallower than the other, a roller mounted in each of said notches, trunnions on each of said rollers, guides for said trunnions, a ring surrounding said cylinder covering said notches, means normally moving said rollers to the shallow end of their notches and key-controlled means for confining said rollers to the deeper end of their notches for the purpose disclosed.

11. A locking device of the type described comprising, in combination, a cylinder, a plurality of notches formed in the periphery of said cylinder, one end of each of said notches being shallower than the other, a roller mounted in each of said notches, a ring surrounding said cylinder covering said notches, a spring in each of said notches normally moving the roller therein to the shallow end of its notch and key controlled means for confining said rollers to the deeper end of their notches for the purpose disclosed.

12. A locking device of the type described comprising, in combination, a cylinder, a plurality of notches formed in the periphery of said cylinder, one end of each of said notches being shallower than the other, a roller mounted in each of said notches, a ring surrounding said cylinder covering said notches, a spring in each of said notches normally moving the roller therein to the shallow end of its notch, a slidably mounted bar in said cylinder for each of said notches and key-controlled means for causing said bars to move into their notches and confine the roller therein to the deeper end thereof for the purpose disclosed.

13. A locking device of the type described comprising, in combination, a cylinder, a plurality of notches formed in the periphery of said cylinder, one end of each of said notches being shallower than the other, a roller mounted in each of said notches, a ring surrounding said cylinder covering said notches, a spring in each of said notches normally moving the roller therein to the shallow end of its notch, a slidably mounted bar in said cylinder for each of said notches, a notch formed in each of said bars and a key-controlled rotatable arm engaging said notches for causing said bars to move into their notches and confine the roller therein to the deeper end thereof for the purpose disclosed.

In testimony whereof I have signed my name to this specification at Paris, France, this 10th day of October, 1927.

LOUIS EUGENE MIQUET.